(12) United States Patent
Bouabdallah (10) Patent No.: US 11,866,166 B2
(45) Date of Patent: Jan. 9, 2024

(54) SYSTEM FORMING A TWO DEGREES OF FREEDOM ACTUATOR, FOR EXAMPLE FOR VARYING THE PITCH ANGLE OF THE BLADES OF A PROPELLER DURING ROTATION

(71) Applicant: Flybotix SA, Lausanne (CH)

(72) Inventor: Samir Bouabdallah, Concise (CH)

(73) Assignee: FLYBOTIX SA, Lausanne (CH)

( * ) Notice: Subject to any disclaimer, the term of this patent is extended or adjusted under 35 U.S.C. 154(b) by 366 days.

(21) Appl. No.: 16/763,442

(22) PCT Filed: Nov. 14, 2018

(86) PCT No.: PCT/IB2018/058962
§ 371 (c)(1),
(2) Date: May 12, 2020

(87) PCT Pub. No.: WO2019/097425
PCT Pub. Date: May 23, 2019

(65) Prior Publication Data
US 2020/0298971 A1    Sep. 24, 2020

Related U.S. Application Data

(60) Provisional application No. 62/585,576, filed on Nov. 14, 2017.

(51) Int. Cl.
*B64C 39/02* (2023.01)
*B64C 11/44* (2006.01)
(Continued)

(52) U.S. Cl.
CPC ............ *B64C 39/024* (2013.01); *B64C 11/06* (2013.01); *B64C 11/44* (2013.01); *B64C 27/08* (2013.01);
(Continued)

(58) Field of Classification Search
CPC . B64C 11/30–44; B64C 27/605; B64C 27/68; B64C 2201/027; B64C 2027/7255;
(Continued)

(56) References Cited

U.S. PATENT DOCUMENTS 4,648,345 A    3/1987  Wham et al.
9,156,548 B2 * 10/2015 Muren .................. B64C 27/605
(Continued)

FOREIGN PATENT DOCUMENTS

EP    2028099 A1    2/2009
FR    2851932 A1    9/2004
(Continued)

OTHER PUBLICATIONS

Translation of FR 2851932 A1 from FIT database (Year: 2004).*
International Search Report & Written Opinion for PCT/IB2018/058962, dated Feb. 19, 2019, 9 pages.

*Primary Examiner* — Christopher R Legendre
(74) *Attorney, Agent, or Firm* — Blank Rome LLP (57) ABSTRACT

A two degrees of freedom actuator for example for multi-bladed rotor of an aircraft with at least two blades that are driven in rotation about a main rotation axis by primary actuator, and a secondary actuator that is arranged to rotate each of said blades about the respective blades' longitudinal axis, with a synchronization means that is operatively arranged for driving the secondary actuator based on an azimuth of the rotor about the main axis for obtaining a determined cyclic pitch of a given amplitude for each blade depending on the azimuth of the rotor.

12 Claims, 12 Drawing Sheets

(51) Int. Cl.
*B64C 11/06* (2006.01)
*B64C 27/08* (2023.01)
*B64U 10/10* (2023.01)
*B64U 30/20* (2023.01)
*B64U 50/19* (2023.01)
*B64U 101/30* (2023.01)

(52) U.S. Cl.
CPC .............. *B64U 10/10* (2023.01); *B64U 30/20* (2023.01); *B64U 50/19* (2023.01); *B64U 2101/30* (2023.01); *B64U 2201/20* (2023.01)

(58) Field of Classification Search
CPC ....... B64C 11/06; B64C 39/02; G02B 26/085; G11B 7/0925; B64U 10/10; B64U 10/13; B64U 30/20
See application file for complete search history.

(56) References Cited

U.S. PATENT DOCUMENTS

| | | | | |
|---|---|---|---|---|
| 9,174,729 B2* | 11/2015 | Muren | ................. | B64C 27/605 |
| 2008/0310001 A1* | 12/2008 | Bernstein | ........... | G02B 26/0833 |
| | | | | 359/198.1 |
| 2020/0298971 A1* | 9/2020 | Bouabdallah | ........... | B64C 27/72 |

FOREIGN PATENT DOCUMENTS

| GB | 2388095 A * | 11/2003 | ............ A63H 27/12 |
|---|---|---|---|
| WO | WO-2008/054234 A1 | 5/2008 | |
| WO | WO-2009/144477 A2 | 12/2009 | |
| WO | WO-2014/160526 A2 | 10/2014 | |
| WO | WO-2017/106324 A1 | 6/2017 | |

\* cited by examiner

SYSTEM FORMING A TWO DEGREES OF FREEDOM ACTUATOR, FOR EXAMPLE FOR VARYING THE PITCH ANGLE OF THE BLADES OF A PROPELLER DURING ROTATION

CORRESPONDING APPLICATIONS

The present application is a national phase application of International Application No. PCT/IB2018/058962, filed on Nov. 14, 2018, which claims priority to earlier US provisional application U.S. Ser. No. 62/585,576 filed on Nov. 14, 2017 in the name of Samir BOUABDALLAH. The contents of these applications are incorporated by reference in their entirety.

FIELD OF THE INVENTION

The primary field of the present invention is a two degrees of freedom (DoF) actuator.

More specifically, the present invention concerns the field of such actuators used in different applications. In the present description, the main illustrative examples and embodiments will relate to applications in the field of aircrafts such as helicopters and drones but this should not be regarded as limiting as regards the teaching of the present invention as will be discussed in detail in the present application.

More specifically, embodiments of the present invention concern a two degrees of freedom actuator for example for multi-bladed rotor of an aircraft with at least two blades that are driven in rotation about a main rotation axis by primary actuator, and a secondary actuator that is arranged to rotate each of said blades about the respective blades' longitudinal axis, with a synchronization means that is operatively arranged for driving the secondary actuator based on an azimuth of the rotor about the main axis for obtaining a predetermined cyclic pitch of a given amplitude for each blade depending on the azimuth of the rotor.

DESCRIPTION OF RELATED ART

Quadrotor helicopter systems, or other multirotor systems including a plurality of coplanar rotary wings are known to be very agile, simple, and reliable. They are, however aerodynamically inefficient once downscaled, thereby substantially reducing flight time.

Another class of rotary-wing aircraft includes the so-called coaxial helicopters, that are compact, and downscale efficiently, preserving flight time.

Conventional full scale helicopters use complex swash-plate mechanisms to achieve cyclic and collective blade pitch control. However, swashplate mechanisms are difficult to miniaturize as they become fragile, maintenance intensive and unreliable. Accordingly, they cannot be applied efficiently, for example to build small scale helicopters or drones and other similar flying machines.

EP2028099 describes a variable-pitch propeller with two coaxial electric motors driving two drive gears, which are arranged on the axis. This system acts collectively on the propeller blades.

U.S. Pat. No. 4,648,345 describes a propeller system with electronically controlled cyclic and collective pitch control, using a plurality of electromagnets positioned in a ring adjacent the rotor's hub.

WO2014160526 A3 describes a passive rotor control mechanism for micro air vehicles. The behavior and benefits of traditional cyclic control in one rotor may be implemented with a simple under-actuated passive mechanism. An air vehicle employing the disclosed technology maintains lifting thrust by regulating the average rotor speed and generates control moments through coordinated pulsing of the motor torque.

SUMMARY OF THE INVENTION

An aim of the present invention is to improve the known actuation systems and methods.

A further aim of the present invention is to provide a system that is simple and allow an efficient miniaturization, for example in applications related to flying machines such as drones.

A further aim of the present invention is to combine the advantages of known quadrotor systems and conventional helicopters by using a simple system to achieve cyclic blade pitch control.

Another object of the present invention is a system for varying the pitch angle of the blades of a propeller during rotation.

Another object of the present invention is a system for varying the pitch angle of a plurality of blades of a propeller cyclically.

Another object of the present invention is a system for varying the pitch angle of a plurality of blades of a propeller cyclically not necessarily in a sinusoidal manner.

Another object of the present invention is a system for varying the pitch angle of a plurality of blades of a propeller cyclically without any swash-plate or complex mechanics.

Another object of the present invention is an electronic control system for simultaneously varying the pitch of a plurality of blades of a propeller cyclically.

Another object of the present invention is a steering and propulsion system for precision steering of an aircraft in six degrees of freedom (DoF).

Another object of the present invention is a rotary wing aircraft, for example a helicopter or an aerial drone capable of decoupling vehicle rotational motion from translational motion. Of course, the present invention is not limited to these applications and to models.

According to the invention, these and other aims are achieved by means of non-limiting embodiments of the invention described herein, illustrated in the figures and as defined in the appended claims.

In an embodiment, the invention concerns a two-degree of freedom actuator, for example for a two-bladed rotor of an aircraft, said actuator comprising at least a primary actuator carrying a secondary actuator, wherein the primary actuator comprises a primary rotating part around a primary axis (A) and the secondary actuator comprises secondary rotating parts rotating around a secondary axis (B), wherein the secondary axis is essentially perpendicular to said primary axis, wherein the actuator comprises a coil which is fixed with respect to said primary and secondary actuator and a magnet rotating with the primary actuator and tilting with the secondary actuator in the coil, wherein the magnet is diametrically-magnetized and able to rotate around the secondary axis thereby leading a rotation of the secondary rotating parts around the secondary axis, the position of the secondary rotating parts being set by the magnetic field of the coil.

In embodiments, the secondary rotating parts comprises an axis such as a shaft.

In embodiments, the two-degree of freedom actuator comprises a motor, for example an electric motor.

In embodiments, the two-degree of freedom actuator comprises at least one energy source. The source may be a battery, for example a rechargeable battery or another equivalent source.

In embodiments, the two-degree of freedom actuator comprises electronic means to control the actuator. The control is made at least via energization of the coil and the influence of the magnetic fields on the magnet.

In embodiments, the invention concerns aircraft comprising at least one actuator as defined herein.

In embodiments, the aircraft preferably comprises two blades.

In embodiments, the aircraft comprises two actuators as defined herein.

In embodiments, the primary axis of the two actuators are essentially parallel or coaxial.

In embodiments, the aircraft may comprise a protection. The protection may have any appropriate shape (circular, oval etc.).

The protection may comprise a ring with tubes on which the actuators are mounted. The tubes may have another shape than tubular, in equivalent variants.

In embodiments, the aircraft may comprise a payload like vision means or detectors. The payload or vision means may comprise at least an optical camera or a thermal camera or both. It may comprise other sensors, such as distance or proximity sensors using technologies such as: capacitive, doppler, photoelectric etc.

In embodiments, the invention concerns a device comprising at least one actuator as defined herein, wherein the device further comprises a functionalized head attached to the secondary actuator. The functional head may be a camera or a laser or a mirror or a cutting head or a painting head or have another function.

In embodiments, the invention concerns a combination of a two degree of freedom actuator as described herein or of an aircraft as described herein or a device as described herein and of a remote control.

In embodiments, the invention concerns a method of controlling an aircraft, such as a helicopter or a drone, comprising at least a rotor with at least two blades, with a collective control for the up, down and yaw movements and a cyclic blade pitch control for the forward, backward, sideward, roll and pitch movement of the aircraft, wherein the cyclic control is implemented by using a two degrees-of-freedom actuator acting on the blades as described herein, and the collective control is achieved by accelerating or decelerating the rotor of the aircraft.

DETAILED DESCRIPTION OF EMBODIMENTS OF THE INVENTION

In an embodiment, the present invention stems from the preferred synergistic combination of several elements:
a. A system for simultaneously varying the pitch of a two blades propeller cyclically (CPC).
b. A system for propulsion and steering (SPS) of an aircraft in six degrees of freedom, comprising two CPC systems described in (a).
c. A system materializes the SPS system described in (b) into an aerial vehicle application, for example a drone, or a helicopter. The aerial drone aircraft ("ADA") is capable of decoupling the rotation motion from the translation motion. Meaning, the drone's rolling or pitching does not necessarily imply a linear translation of the drone.
d. The aerial drone operation is managed through control algorithms specifically developed for the systems ADA, SPS and CPC systems.

Cyclic Propeller Control (CPC)

In conventional helicopters, the propulsion is ensured with a main rotor, while the steering is done with a swashplate and a tail rotor. The swashplate has typically two main functions: collective blade-pitch-control for the up and down movements of the vehicle (helicopter) and cyclic blade-pitch-control for the forward or back movement of the helicopter. In embodiments, the present invention presents a swashplate-less system, based on the separation of the cyclic and the collective controls. The cyclic control is implemented thanks to the use of a two degrees-of-freedom actuator, while the collective control is simply and preferably achieved by accelerating or decelerating the rotor.

FIGS. 1A to 1D illustrate the principle of a possible embodiment of the cyclic propeller control system. The system comprises a main motor (203), typically an electric motor, which drives the shaft 103 to spin (motion A) the rotor comprising the blades 100 and 101 and the rotor-attached parts: namely a magnet 104, mechanical parts 105 and 106, and shaft 107.

A secondary actuator comprising the axially wounded air-cored coil 102 and the magnet 104 control the longitudinal tilting of the blades (motion B). The part 106 is fixed to the shaft 103. The magnet 104 is fixed to the part 105. Part 105 can tilt relatively to part 106 around the longitudinal axis of shaft 107. The parts 104 and 105 can rotate about a main axis ("motion A"), essentially vertical and tilting about a secondary axis, essentially orthogonal to the main axis ("motion B").

Figure 1A:
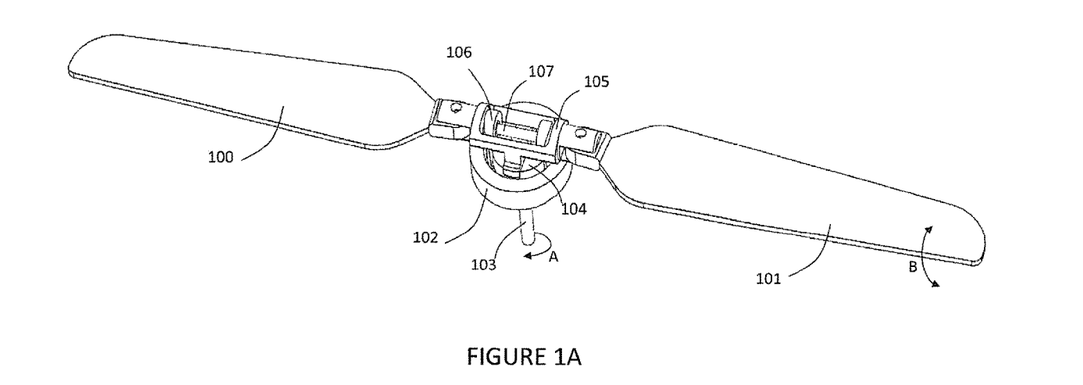
FIG. 1A illustrates a perspective view of an embodiment of the present invention.
Figure 1B:
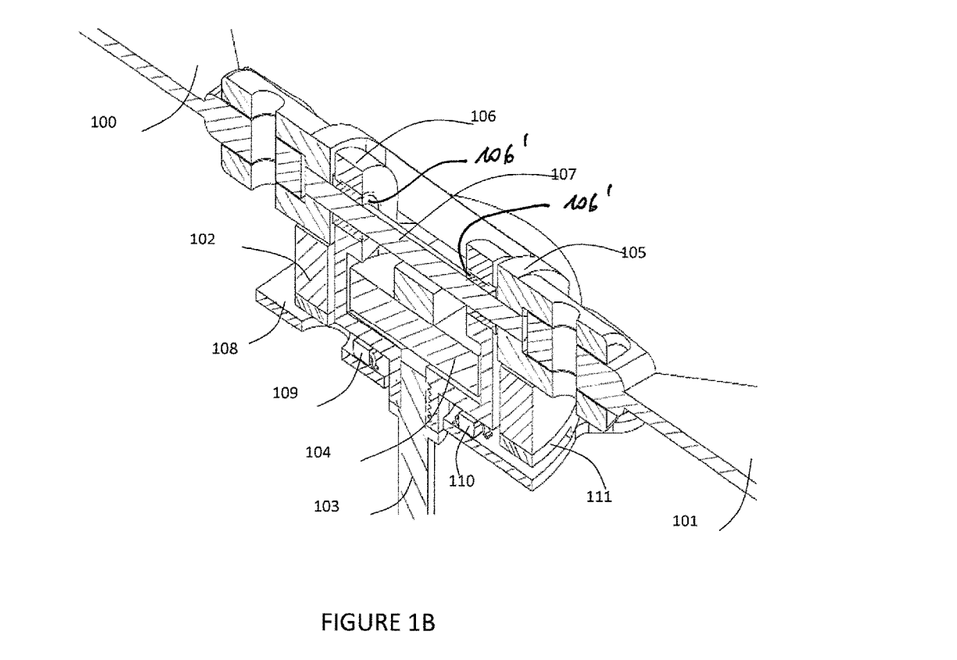
FIG. 1B illustrates a cut view of the principle of the invention according to an embodiment of the present invention.
Figure 1C:
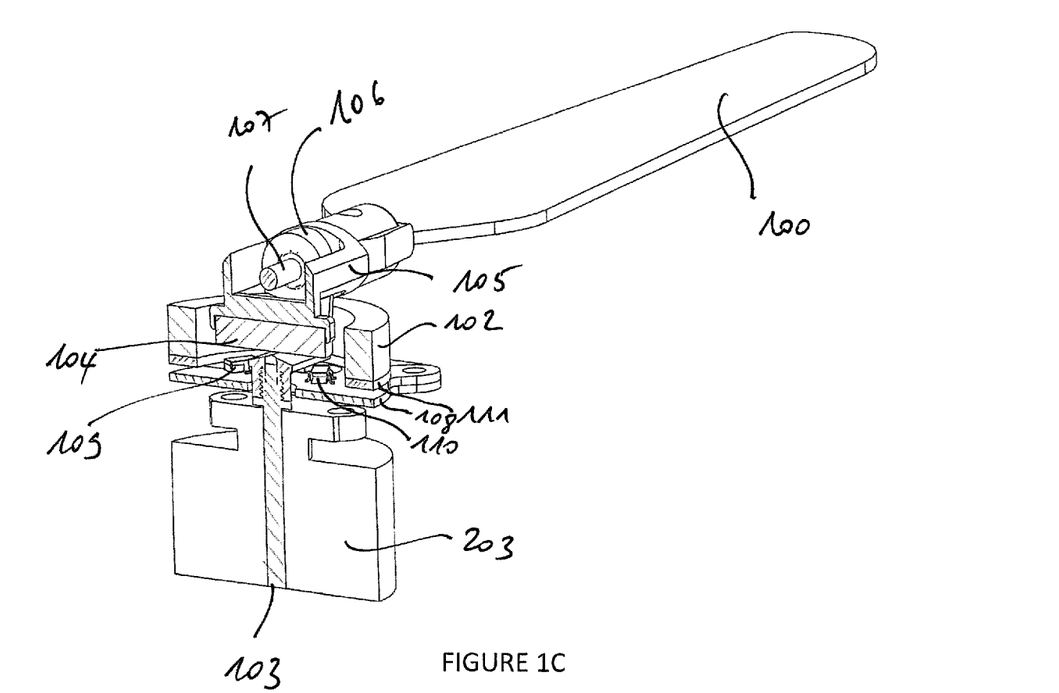
FIG. 1C illustrates a cut view in perspective of the principle of the invention according to an embodiment of the present invention.
Figure 1D:
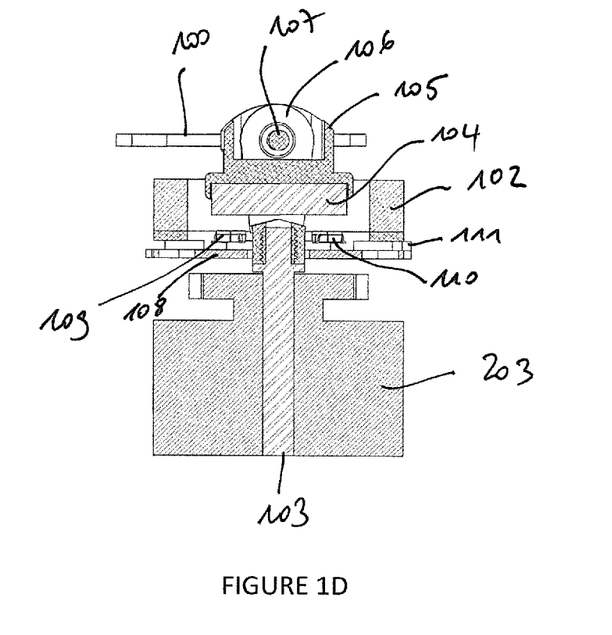
FIG. 1D illustrates a cut view in perspective of the principle of the invention according to an embodiment of the present invention.

FIGS. 1B to 1D illustrate section views of the system shown in FIG. 1A. Part 108 represents a Printed Circuit Board ("PCB") that comprises sensors 109 and 110 which allow to detect the angular position of the shaft 103 ("azimuth"). The part 111 is a mechanical support to the coil 102.

Preferably, the main motor 203 spins the rotor about a main axis, essentially vertical (motion A). The blades are driven by the secondary actuator in such a manner that they rotate simultaneously and in the same direction about a transversal axis (motion B), essentially orthogonal to the main axis. The desired cyclic pitch (for example sinusoidal) can be obtained by a suitable control of the secondary actuator dependent on the azimuth (angular position) of the rotor (shaft 103) around the main axis, for example detected by sensors 109/110. By an appropriate current injection in the coil 102 and the resulting magnetic field, the magnet 104 which is diametrically-magnetized will be driven (i.e. tilted) to transmit a tilting motion to the parts 105 around the axis of shaft 107 and thus produce the pitch/motion B to the blades. This tilting motion is possible notably via the bearings 106' placed between shaft 107 and part 106. This construction gives a maximum torque through push-pull effect on the pitch rotation of the magnet 104 which is transmitted to the blades 100, 101.

A combination of typically magnetic, optical, or similar sensors 109, 110 may be used to detect the rotation of the main motor in order to command the secondary actuator to act (tilt) at the right azimuth and with the right amplitude. The combination of sensors is also used to detect the longitudinal tilt angle of the blades.

Preferably, at every rotor revolution, the cyclic blade pitch control algorithm ("CPCA") energizes the coil at the azimuth and with the amplitude commanded by the ADA drone stabilization algorithm ("ADAA"). The generated coil's magnetic field will cause the diametrically-magnetized magnet to tilt around the longitudinal axis of the shaft 107, trying to align its magnetic field with the magnetic field of the coil.

As an example, exactly half a rotor revolution later, the CPCA algorithm energizes the coil in the opposite direction by inverting the current. This way, the magnet will, in every rotor revolution tilt at the commanded: azimuth, direction and amplitude.

Exemplary Embodiment of a System for Propulsion and Steering (SPS)

There exist several configurations of helicopters and drones, ranging from single rotor, tandem rotors, quadrotors and multi-rotors in general. The present invention combines two cyclic propeller control (CPC) systems in a 6 DoF propulsion and steering system. The two CPC systems are laid out head to tail ("tête-bêche") in an embodiment illustrated in FIG. 2.

Figure 2:
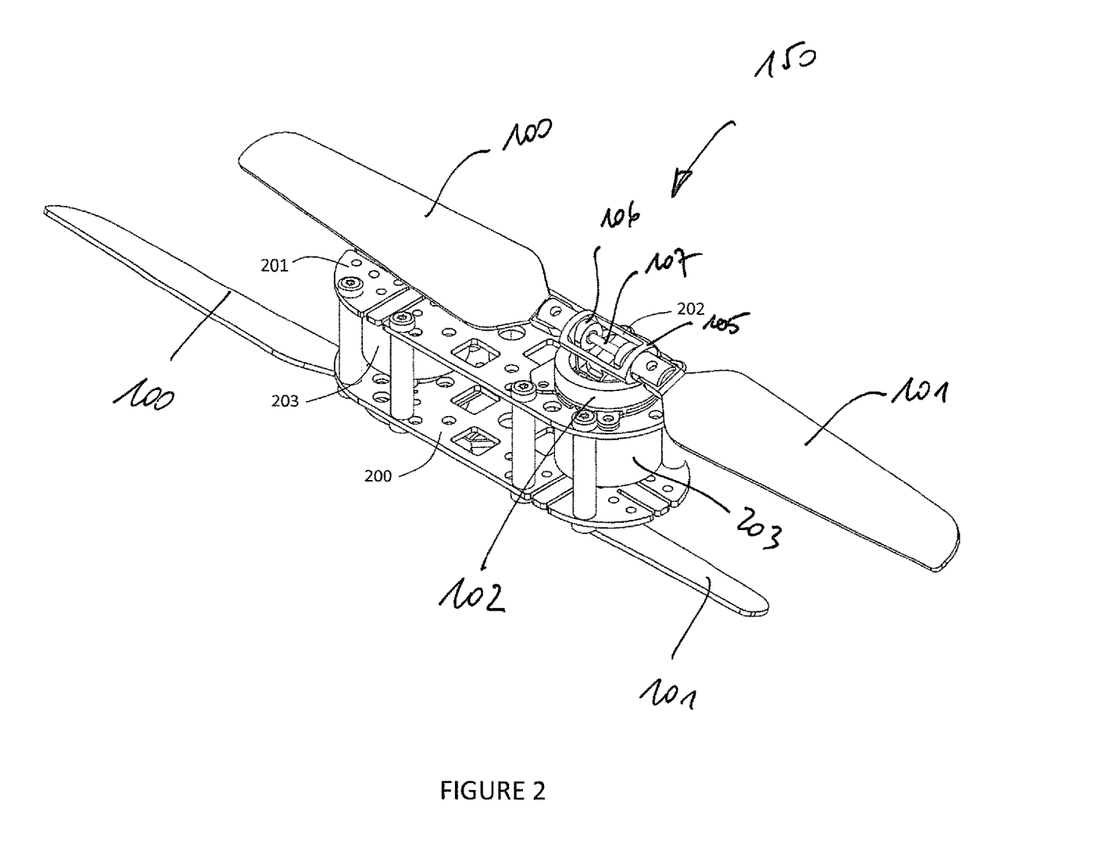
FIG. 2 illustrates a perspective view of an embodiment of the present invention.

FIG. 2 illustrates a possible embodiment of a system 150 for propulsion and steering of an aerial drone in 6 DoF. It combines two cyclic propeller control (CPC) systems 202 as illustrated in FIGS. 1A and 1B with blades 100, 101, motors 203 which rotate the shaft 103 (FIGS. 1A and 1B) and some structural elements 200 and 201, such as support plates (for example in metal, plastic or carbon, or a mix therefrom). This forms a unit that can be used in an aerial vehicle such as a drone as illustrated in the next FIG. 3.

Exemplary Embodiment of an Aerial Drone Aircraft (ADA)

Figure 3:
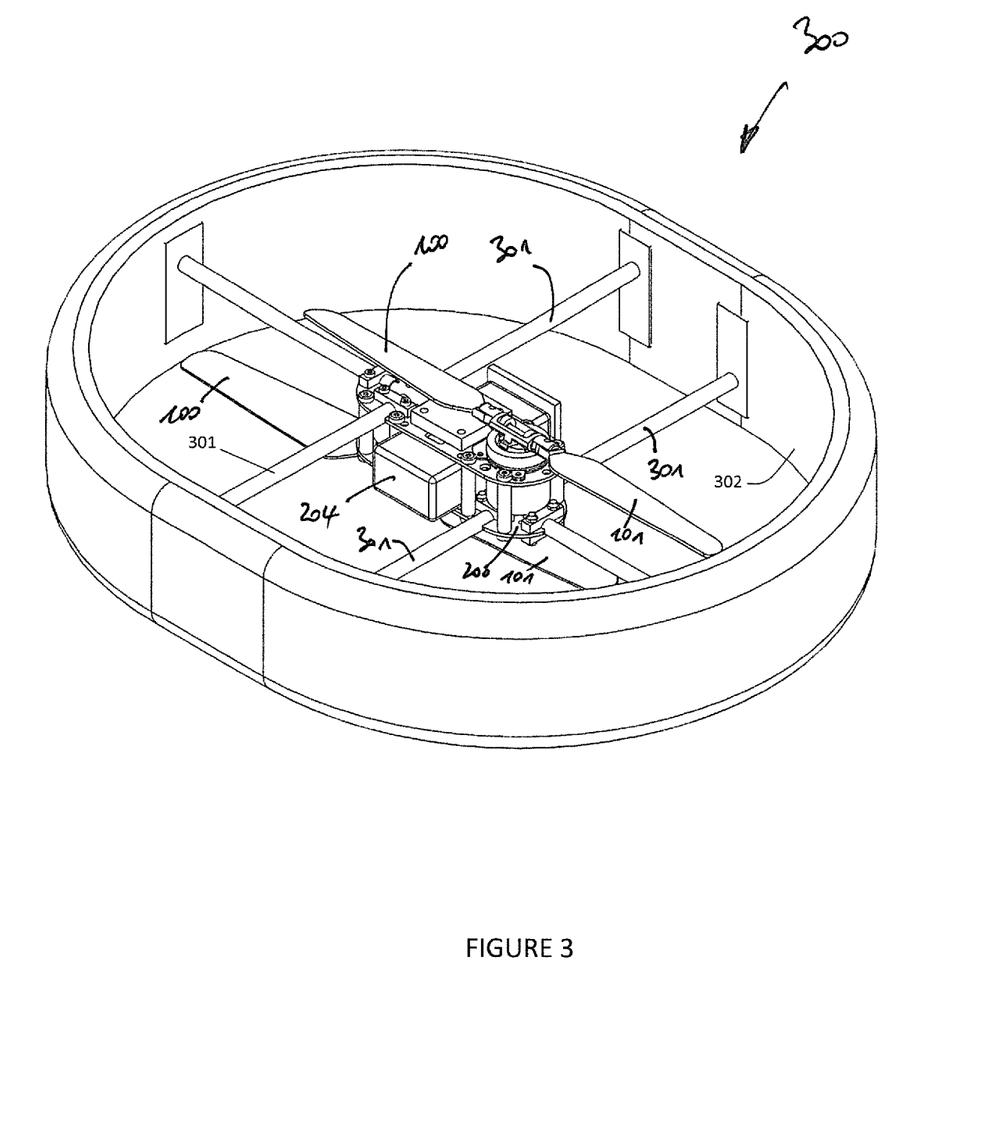
FIG. 3 illustrates a perspective view of an embodiment of the present invention.

The Aerial Drone Aircraft (ADA) 300 comprises at least one (SPS) system 150 as disclosed above in FIG. 2, mechanically linked to an external ring 302, as illustrated in FIG. 3 as an exemplary embodiment. The ring 302 is not only protecting the blades 100, 101, but serves also as a support for various components like a camera, a battery and several sensors, or other elements as desired as will be described later in the present specification. A battery (such as a rechargeable battery) is identified by reference 204, and placed in the middle of the system 150 (FIG. 2 shows the system 150 without the battery 204).

In a conventional rotary wing aircraft, rotation and translation motions are inherently coupled. In fact, when the vehicle pitches or rolls, it causes the vehicle to translate in longitudinal or lateral directions. In some applications this coupling might be undesirable. In order to avoid this coupling, the aircraft (ADA) according to the present invention is constructed in a way to achieve roll or pitch without necessarily a translation. This is obtained through the combination of the head to tail ("tête-bêche") layout of the SPS system of FIGS. 2/3 and the central positioning of the aerial drone center of gravity between the two CPC systems forming the system 150 and by using appropriate sensors and control algorithms. This way, the horizontal components of the thrust forces compensate each other and the system remains on the spot despite the tilt motion. The motion of the ADA 300 is controlled through an appropriate control algorithm. This provides the unique ability of setting at will and controlling the attitude of the aircraft while hovering on the spot.

FIG. 3 illustrates the Aerial Drone Aircraft (ADA) in a possible embodiment. Parts 301 are structural elements such as tubes, for example to link the external ring 302 to the plates 200/201 (see FIG. 2). Part 302 is a structural element protecting the propellers 100, 101 from colliding with humans or objects. Part 302 is typically made out of foam or carbon as an example.

Figure 4:
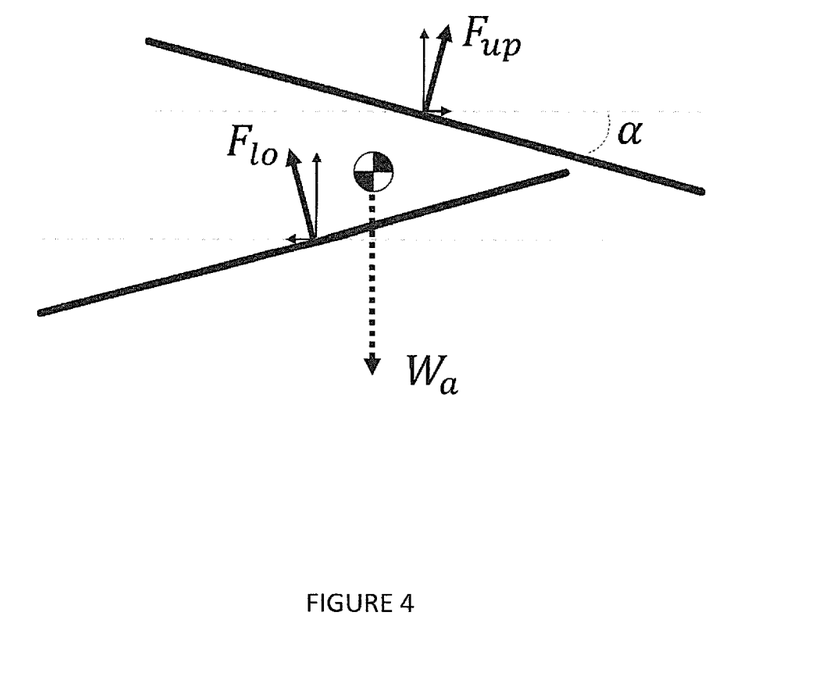
FIG. 4 illustrates the principle of an embodiment of the present invention.

FIG. 4 is a schematic representation of the free force diagram of the SPS and ADA systems. The vertical components of the two thrust forces compensate the weight, while the horizontal components of the two thrust forces compensate each other. Using an appropriate control system, the tilt on the spot of the SPS and ADA systems is achieved.

Other Exemplary Embodiments of Systems for Propulsion and Steering (SPS)

Figure 5:
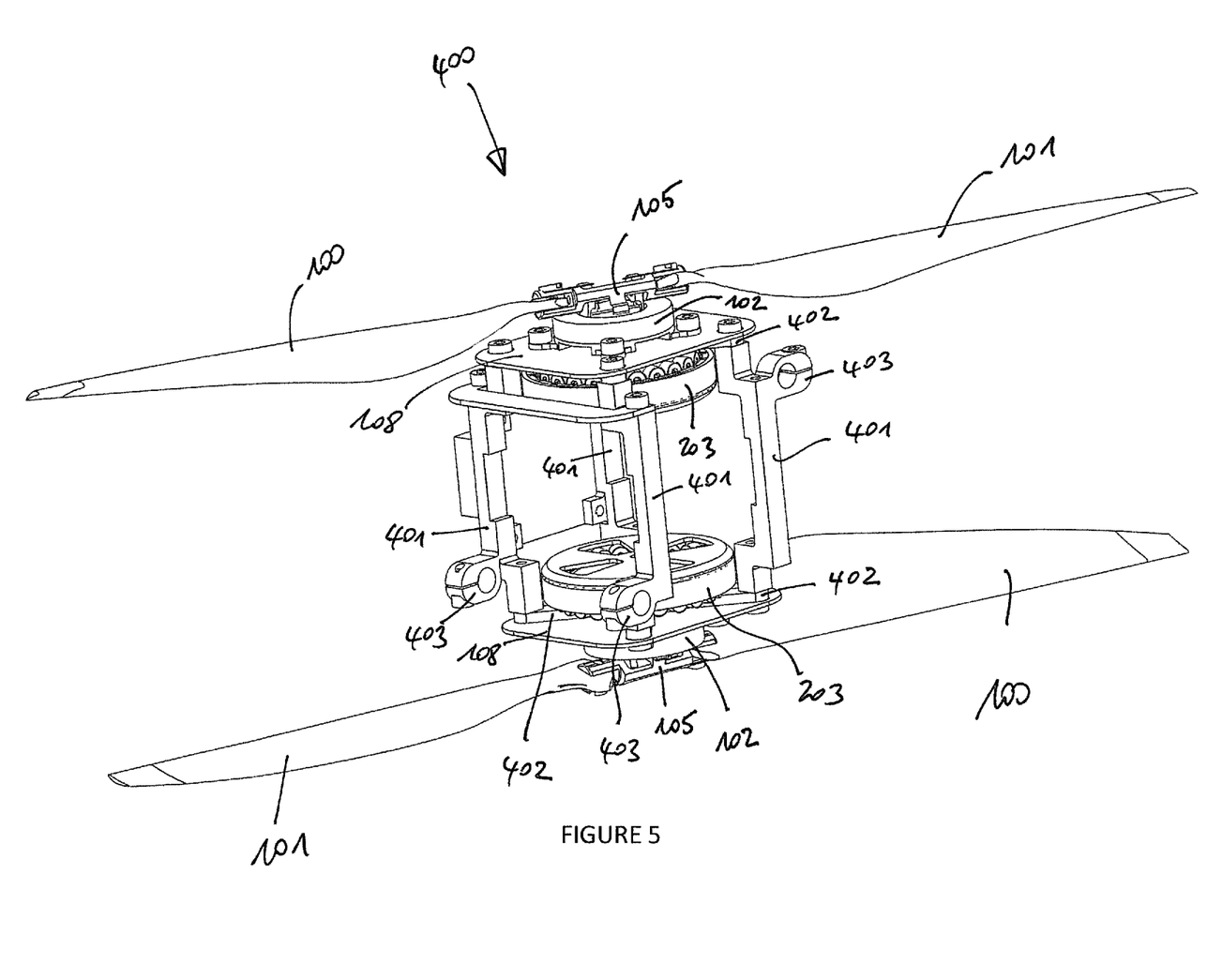
FIG. 5 illustrates a perspective view of an embodiment of the present invention.
Figure 6:
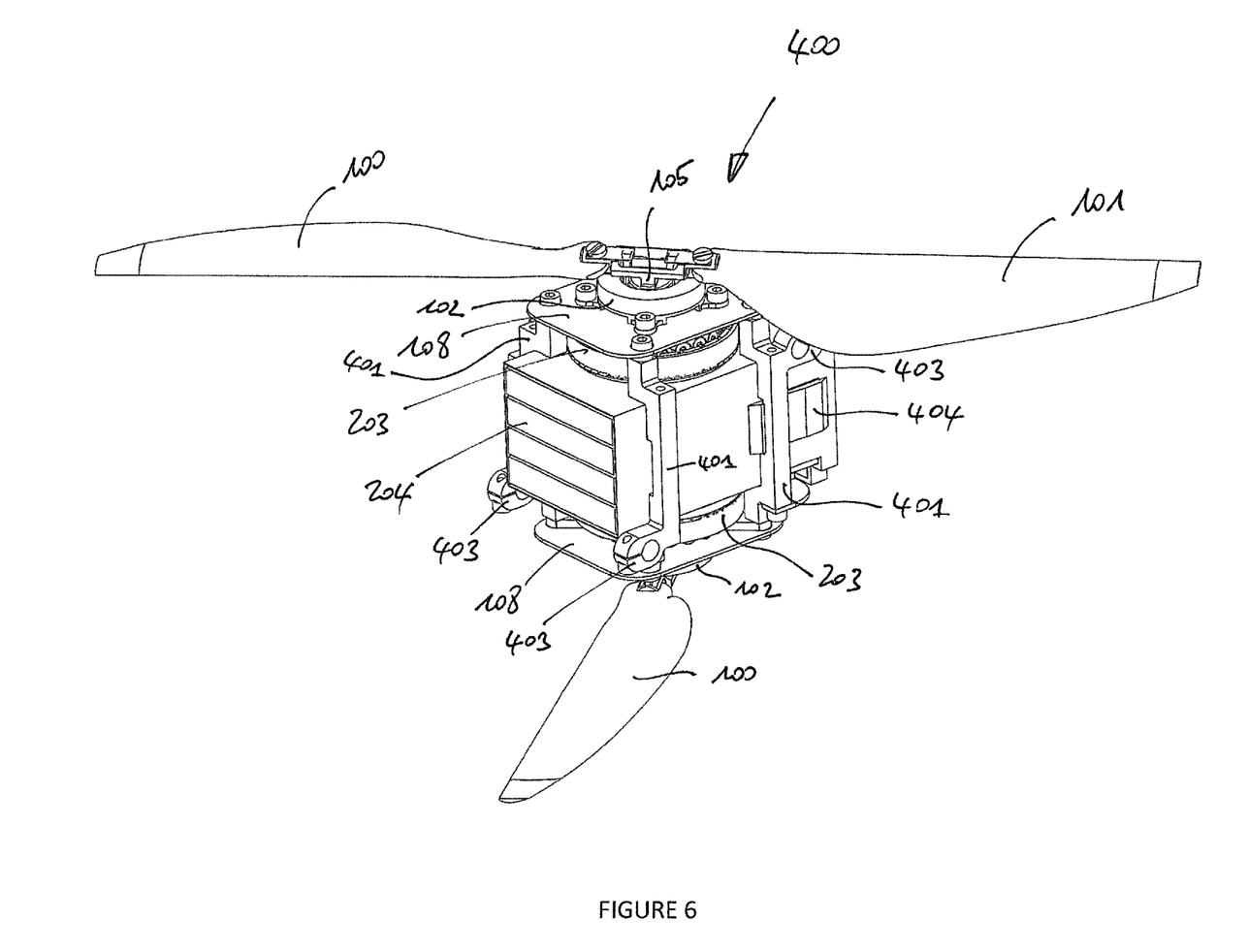
FIG. 6 illustrates a perspective view of an embodiment of the present invention.

FIGS. 5 and 6 illustrate another embodiment of a system for propulsion and steering (SPS) 400. This system is basically similar to the one described previously and comprises the same features as described in reference to FIGS. 1A and 1B. The one difference with respect to the embodiment of FIG. 2 is that the shafts 103 of each unit are placed coaxially. This brings a very compact construction.

A frame holds the motors 203 in position, the frame comprising mainly four pillars 401, and two crosses 402 at each end to build a stable structure. The crosses 402 also hold the PCBs 108 used for the control of the motors and the tilting system of the present invention.

At the end of the pillars 401, there are four apertures 403 that will be explained later.

FIG. 6 illustrates the same embodiment as FIG. 5, but with a battery 204 which is inserted in the middle of the structure and held by appropriate means, for example clip 404 (one being on the other side of the battery 204 and not visible in FIG. 6). Appropriate connecting means are of course provided so that introduction of the battery allows the energy of the battery 204 to be brought to the motors 203 and tilting system.

Other Embodiments of ADAs

Figure 7:
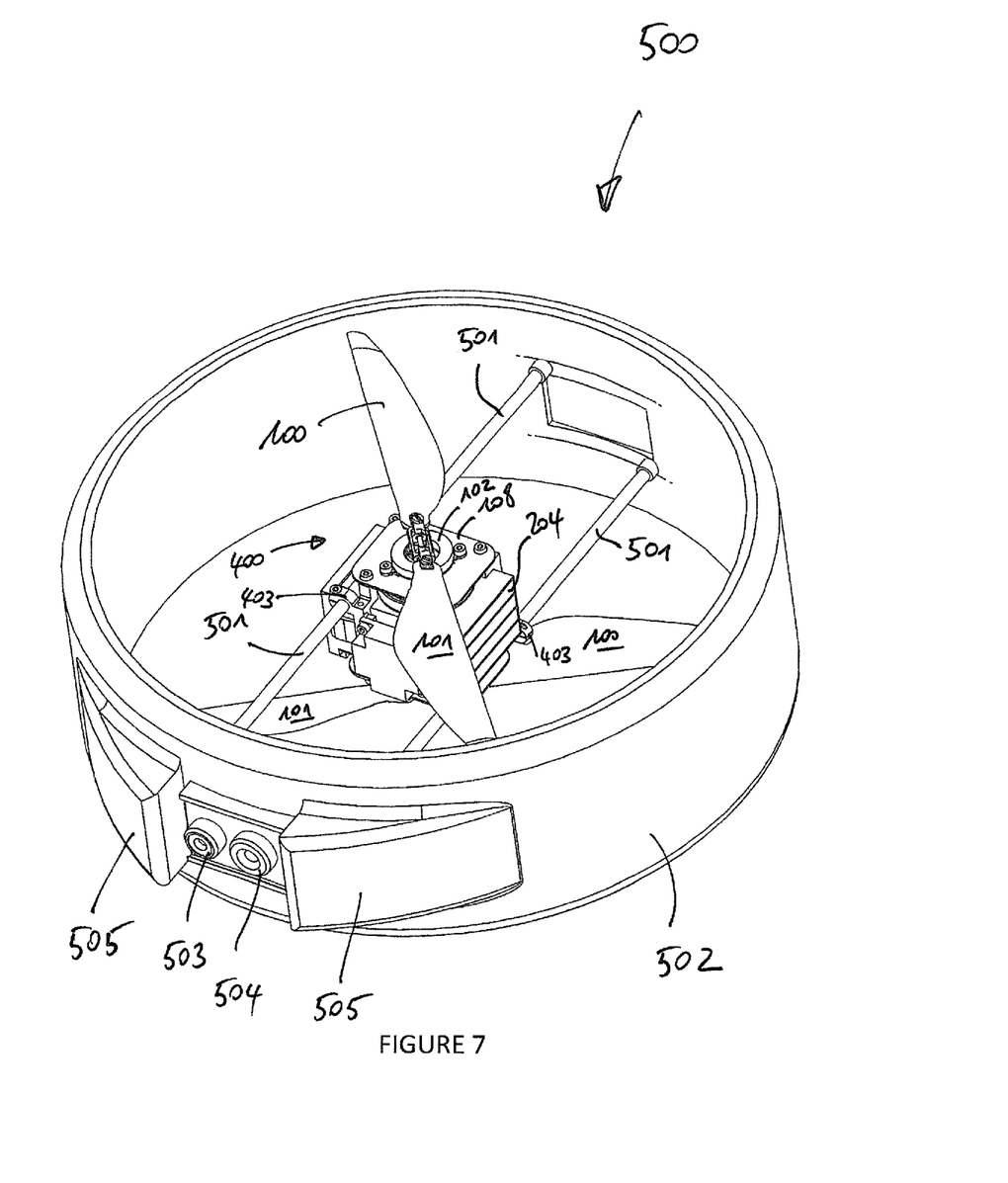
FIG. 7 illustrates a perspective view of an embodiment of the present invention.

FIG. 7 illustrates another embodiment of an aerial drone aircraft 500 according to the present invention. This drone 500 comprises the SPS 400 of FIGS. 5 and 6 which is held by tubes 501 in a ring 502. Both ends of the tubes 501 are attached to the ring and the SPS 400 is fixed on the tubes via the apertures 403 which are used to clamp the tubes, once the SPS 400 is at the proper position in the ring 502. This principle is of course applicable to the structure illustrated in FIG. 3 as well.

The ring may be made with synthetic/plastic materials, foam, carbon fibers and/or a mix therefrom. In one embodiment, the ring may comprise reinforcing means, for example a carbon ring.

The embodiment of FIG. 7 also comprises an optical camera 503, a thermal camera 504 with are shielded by protections 505. Of course, only one camera may be used and these means are applicable to all embodiments disclosed herein.

Figure 8:
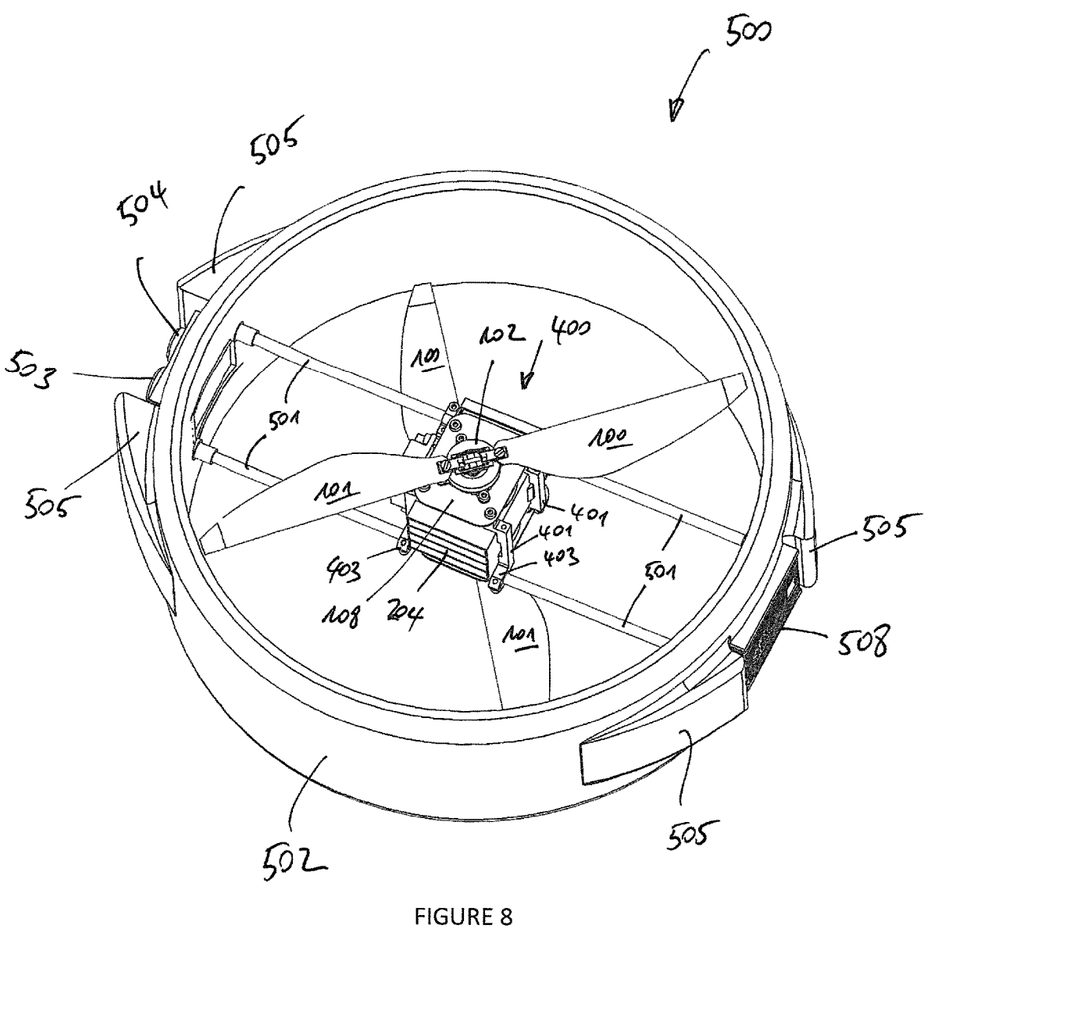
FIG. 8 illustrates a perspective view of an embodiment of the present invention.

FIG. 8 illustrates the ADA 400 of FIG. 7 seen from the bottom.

Figure 9:
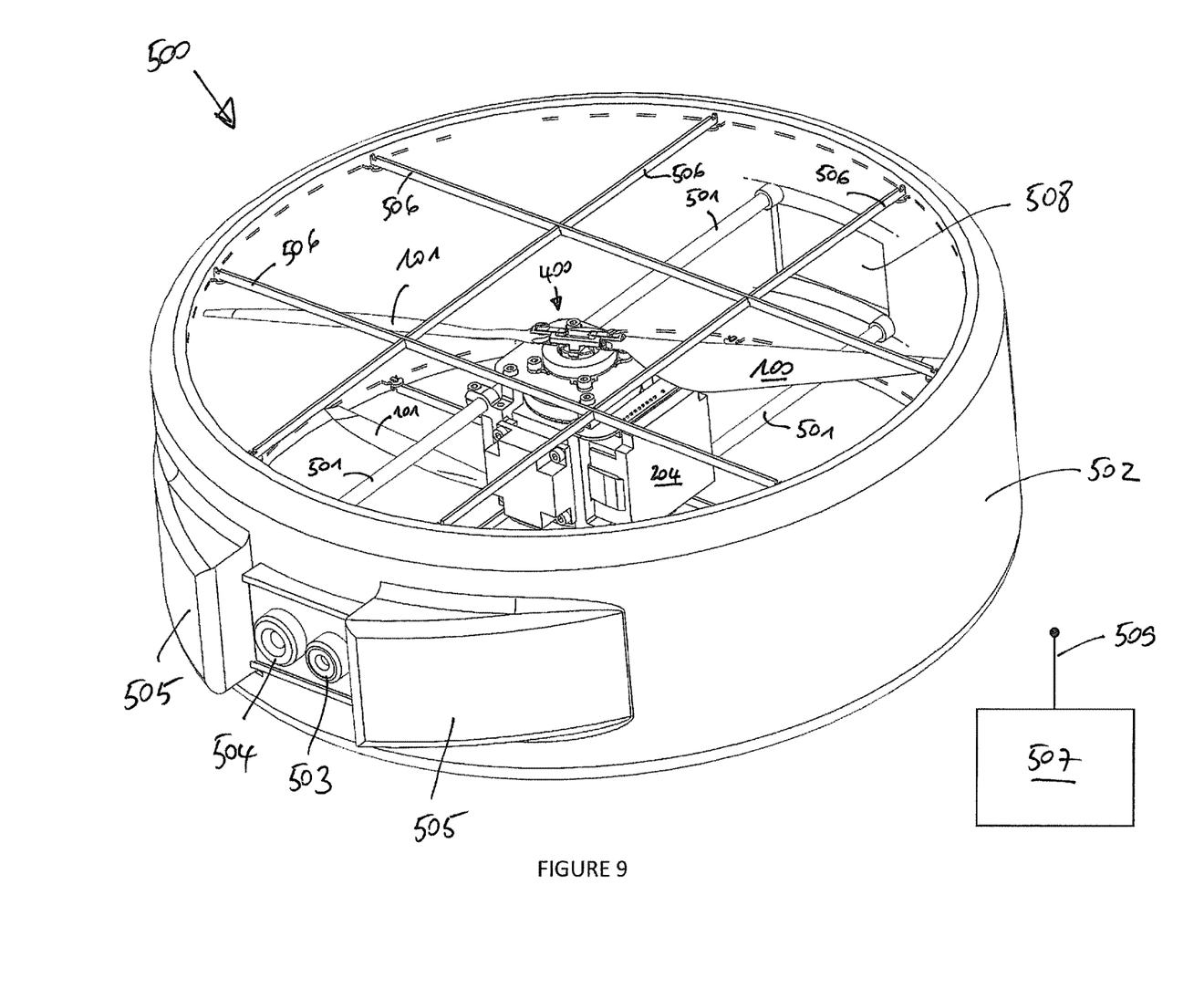
FIG. 9 illustrates a perspective view of an embodiment of the present invention.

FIG. 9 illustrates another embodiment of an ADA. For example, this may be the ADA 500 of FIGS. 7 and 8, on which a grid or wire mesh 506 has been added for protection purposes. This grid may also participate to the rigidity of the ADA. Of course, such a grid 506 may be used in the ADA of FIG. 3 and other embodiments not specifically illustrated herein but falling within the scope of the present specification.

Exemplary Embodiments as Application of ADA Drone Technology

The exemplary embodiments in a drone system (ADA) presented above and herein may be used in, but not limited to applications like: aerial photography, inspection, payload delivery, surveillance, aerial filming, mapping, entertainment. Unlike many other existing aircraft, the tilt on the spot feature removes the need for attaching a gimbal system when a camera or a payload is used.

As is usual in the field, particular of drones but not limited thereto, the aircraft may be remote controlled, for example by a user. Accordingly, a remote control system (507, see FIG. 9) and capabilities may be provided in an embodiment of the invention, with appropriate antennas/transmission means (used for remote control and/or data transmission, 508, 509 see FIG. 9), remote control unit (507), remote vision and/or Virtual reality (VR) for example using parts/sensors of the device on which the actuator according to the invention is mounted, GPS capabilities to guide the device (such as an aircraft) to a desired position (as an aim, or for a safe landing or emergency landing), distance evaluation means (such as optical sensors or distance sensors) may be provided on the device to avoid collisions with obstacles. Also patterns may be stored in the system to define a predetermined functioning of the actuator. In the case of the application to an aircraft, a pattern could be a predetermined flight to reach a certain point, the pattern following a route determined (for example) by GPS coordinates which are then transformed into automatic or semi-automatic flight controls of the aircraft.

Although not specifically, described, it is clear for a skilled person that the present invention comprises electronic means, such as a chip (or IC, such as 109, 110) for example, in which the necessary programs/codes/routines are stored and/or accessible via radio/remote command as appropriate for proper monitoring and control. Other electronic parts such as wires, energy sources, antenna 508, 509 etc. are also present as necessary to operate the system of the invention, notably as a remote controlled object, all being within the scope of the present specification and invention.

Preferably, the parts of the system described herein are made in material that are light and rigid. For example, the parts forming the actuator 103, 105-107, 200, 201, 202 or the supports 301, 401, 402, 403, 501, 506 are made of metal (for example aluminum or another light metal/material), the blades 100, 101, protections 302, 502, 505 are made of synthetic materials as non-limiting examples. Carbon may also be used alone or in combination with other materials for any part of the system, as appropriate.

Embodiments of Control Algorithms

There are several control algorithms needed to ensure a good operation of the ADA drone. The main ones are: Cyclic blade pitch control (CPCA) at the right azimuth; ADA drone 6 DoF stabilization (ADAA); Tilt on the spot control algorithm (TOSA).

The Cyclic blade pitch control algorithm (CPCA) executes the following steps:
1. Continuous detection of the main motor angular position relatively to the ADA drone frame.
2. Depending of the desired ADAA control input, the CPCA energizes the coil 102 at least twice in a one rotor revolution.

Of course, other control algorithms may be used in embodiments of the invention, depending on the application of the actuator described herein. Also the signal energizing the coil 102 may be a sinusoidal signal or it may have another shape which is not sinusoidal or it may by symmetrical or non-symmetrical or a combination thereof.

The embodiments and features of the present invention are given as illustrative examples and should not be construed in a limiting manner. The principle of the present invention may be applied to any vehicle, in particular aerial vehicles such as drones, helicopter or the like aircrafts, with no size limitation.

Figure 10A:
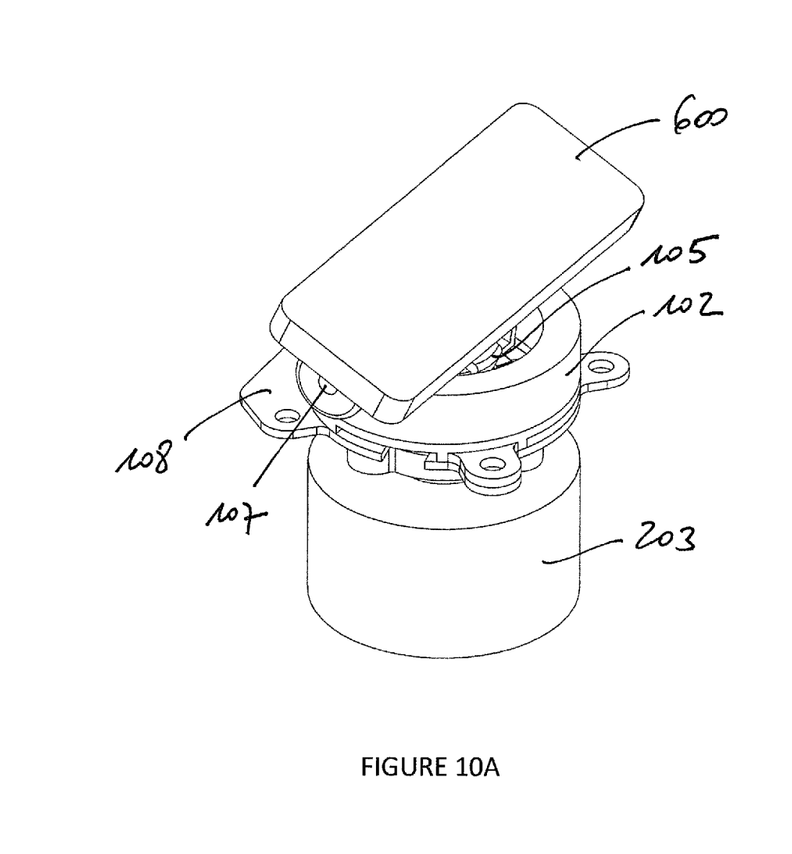
FIGS. 10A and 10B illustrate perspective top and side views of an embodiment of the present invention.
Figure 10B:
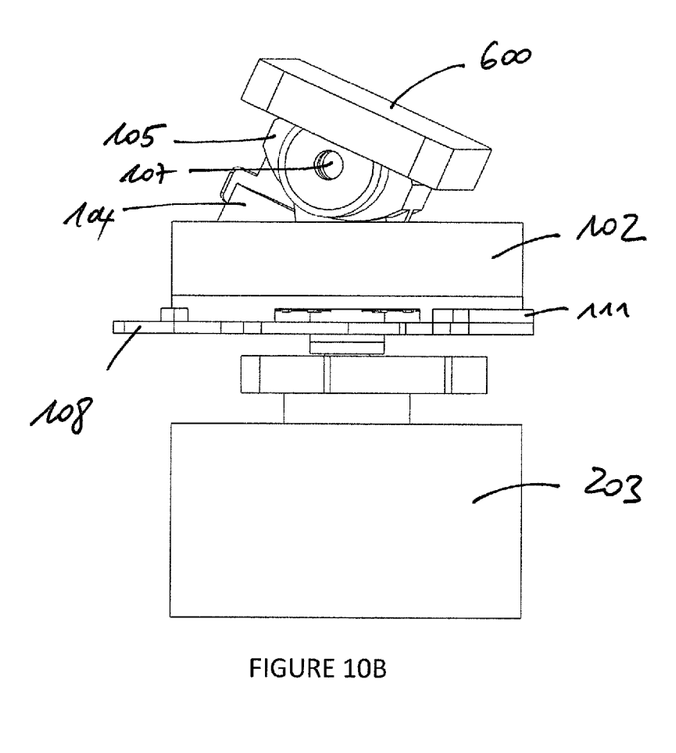

Also, the main examples and embodiments given herein relate to drones and flying aircrafts but the present invention is not limited to this application. The principles of a two degree of freedom actuator or support according to the present invention may be used in other applications such as a support for a functionalized head such as cameras and other similar devices, for a laser and laser head, for a mirror, for a cutting head (for example jet cutting head), for a painting head, for optical or illumination means etc. FIGS. 10A and 10B illustrate the principle of a device with a functionalized head 600 able to carry out the functions listed above as application examples. The actuator is the one described herein and as illustrated in FIGS. 1A-1D and the blades 100, 101 are replaced by the desired functionalized head 600. The description above thus applies correspondingly to this embodiment. Head 600 may be the functionalized head per se or a support for the head.

Exemplary embodiments have been described to provide an overall understanding of the principles of the structure, function, manufacture, and use of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined not solely by the claims. The features illustrated or described in connection with one exemplary embodiment may be combined with the features of other embodiments. Such modifications and variations are intended to be included within the scope of the present invention. A number of problems with conventional methods and systems are noted herein and the methods and systems disclosed herein may address one or more of these problems. By describing these problems, no admission as to their knowledge in the art is intended. A person having ordinary skill in the art will appreciate that, although certain methods and systems are described herein with respect to different embodiments, the scope of the present invention is not so limited. Moreover, while this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A swashplate-less two-degree of freedom rotor of an Aerial Drone Aircraft (ADA), comprising:
    a motor driving a first shaft around a primary axis (A)
    two blades joined together by a second shaft oriented along a secondary axis (B) perpendicular to said primary axis (A), and fixed to said first shaft by means of a first mechanical part and a second mechanical part, said first mechanical part being adapted to tilt relatively to said second mechanical part around said secondary axis (B), while being centered on said primary axis (A), so as to transmit tilting motion to said blades,
    a magnet that is diametrically-magnetized and attached to said first mechanical part, so that said first mechanical part and said magnet can rotate about said primary axis (A) and tilt about said secondary shaft,
    an axially wounded air-cored coil fixed on a mechanical support, so that said magnet can rotate in said axially wounded air-cored coil,
    wherein bearings are placed between said second shaft and said second mechanical part so as to allow transmission of a torque to said blades through tilting of said magnet and said first mechanical part caused by a magnetic field generated by said axially wounded air-cored coil.

2. The swashplate-less two-degree of freedom rotor according to claim 1, further comprising at least one energy source.

3. The swashplate-less two-degree of freedom rotor according to claim 1, wherein said axially wounded air-cored coil is energized according to a cyclic blade pitch control algorithm adapted to energize said axially wounded air-cored coil at an azimuth, corresponding to an angular position of said first shaft, by a current and by inverting the current so that the magnet tilts at every revolution at the commanded azimuth, direction and amplitude.

4. The swashplate-less two-degree of freedom rotor according to claim 1, wherein said blades are joined with said second shaft so that they are driven in such a manner to rotate simultaneously.

5. The swashplate-less two-degree of freedom rotor according to claim 1, further comprising a printed circuit board comprising sensors, which allow detection of an angular position of the first shaft.

6. The swashplate-less two-degree of freedom rotor according to claim 5, wherein said sensors comprise a combination of one or more of a magnetic and/or one or more optical sensors, adapted to detect a longitudinal tilt angle of the blades in addition to the angular position of the first shaft.

7. An aircraft comprising at least one swashplate-less two-degree of freedom rotor as defined in claim 1.

8. The aircraft according to claim 7, wherein said aircraft comprises two of said at least one swashplate-less two-degree of freedom rotors, wherein the primary axis of each of said two of the at least one swashplate-less two-degree of freedom rotors are parallel or coaxial.

9. The aircraft according to claim 8, wherein said aircraft further comprises structural elements comprising an external ring protecting said swashplate-less two-degree of freedom rotors from colliding with a human or objects, said structural elements being made out of foam or carbon and including tubes adapted to link said swashplate-less two-degree of freedom actuators to said external ring.

10. The aircraft according to claim 7, said aircraft comprising vision detectors comprising an optical camera or a thermal camera.

11. A device comprising at least one swashplate-less two-degree of freedom rotor as defined in claim 1, wherein said device further comprises a remote control.

12. A method of controlling an aircraft, comprising at least a swashplate-less two degrees of freedom rotor according to claim 1, comprising a cyclic blade pitch control implemented by means of energization of the axially wounded air-cored coil for forward, backward, sideward, roll and pitch movements of the aircraft, and a collective control for up, down and yaw movements of the aircraft achieved by accelerating or decelerating the rotors.

* * * * *